Patented July 22, 1941

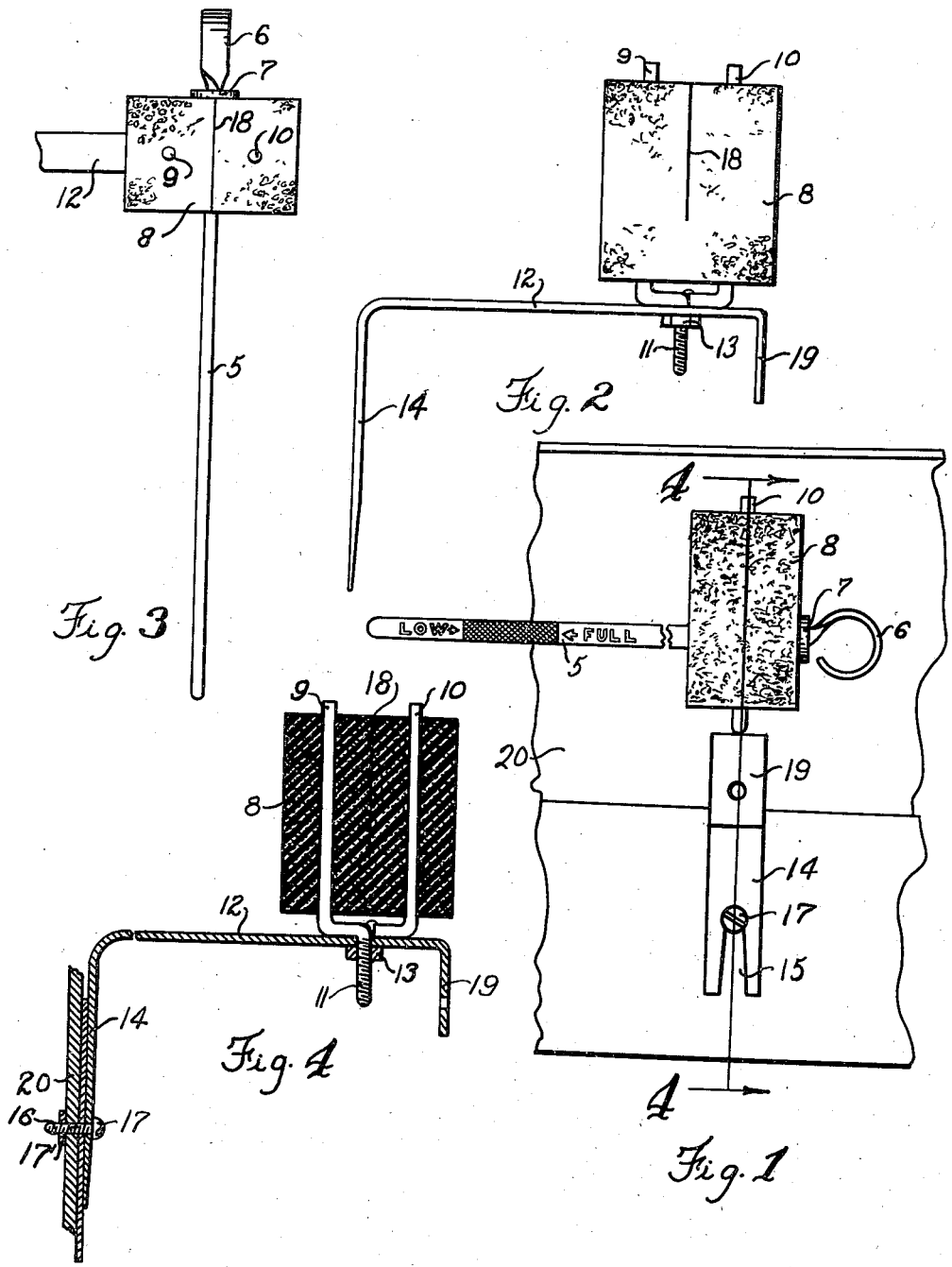

UNITED STATES PATENT OFFICE 2,250,374

OIL WIPER

Russell M. Hays, Hagerstown, Ind.

Application August 14, 1940, Serial No. 352,543

2 Claims. (Cl. 15—210)

Most, if not all, motor vehicles carry, suspended in the housing of the engine from the opening through which oil for lubrication is supplied, a long narrow metal strip called an oil stick, which reaches to the bottom of the oil supply, and which is used to measure the quantity of oil in the receptacle at any time.

To do this, however, the stick is withdrawn and the adhering oil wiped off, after which the stick is reinserted in the oil in the housing and the quantity contained there measured by the distance which the stick is wetted by the oil above its lower end.

The stick, heretofore, has been wiped on a loose rag which is often not conveniently at hand and the object of this invention is to provide a superior substitute for a rag, which will be compact and of neat appearance and to provide a holder, attachable to the car at any convenient place where there is a bolt for its attachment, preferably under the hood where it will be generally covered.

I accomplish the above and other objects which will hereinafter appear, by the means illustrated in the accompanying drawing, in which—

Fig. 1 is a front elevational view of my stick wiper and holder showing a stick being wiped;

Fig. 2 is a side elevational view of the wiper and holder without the stick;

Fig. 3 is a top plan view of the wiper and a fragment of the holder, and showing a stick; and Fig. 4 is a vertical section of the line 4—4 in Fig. 1, with the stick omitted.

Like characters of reference indicate like parts in the several views in the drawing.

A stick to be wiped is shown at 5, having a finger ring 6 at its top end and an adjacent disc 7 which normally supports it in the engine housing. The stick generally has gauge marks, as shown.

The wiper 8, preferably, and as here shown, is formed of sponge rubber, but any other suitable material may be substituted. The wiper is here shown as prismatic in shape, which is preferable, but it may be elliptical in cross section—cylindrical, or otherwise, without departing from the spirit of my invention.

The wiper is formed with a pair of spaced apart parallel holes for the passage of the legs 9 and 10 of a U-shaped connector having a threaded stem 11. As here shown, the leg 9 and stem 11 are formed out of a single bar and the bent lower end of leg 10 is welded or soldered to the other members.

The stem 11 is inserted through a hole in the horizontal bar 12 of a wiper supporting bracket to which bar 12 it is secured by a nut 13.

One end of the bar 12 is bent down to form a leg 14, the lower end of which is formed with a slot 15, relatively deep, forming a fork, and the resulting members on each side are preferably thinned to a downward wedge shape to facilitate the insertion of the slotted leg back of the head 17 of a bolt, such as the bolt 16.

The bolt 16 may be any conveniently located bolt already installed in the car, preferably under the hood 20 where it will normally be out of sight and protected from dust, and where it will be conveniently accessible for use.

The attachment of the bracket is accomplished by loosening nut 17' and forcing the fork of the leg 14 back of the head of the bolt 16 and then retightening the nut 17.

Referring again to the wiper 8, it is formed with a slot 18 midway between the legs 9 and 10 of the U-shaped connector, at right angles to the plane in which said legs are located and extending down from the top approximately two-thirds of the thickness of the wiper, as shown in Figs. 2 and 4.

In the operation of my device, the stick 5 is wiped by drawing it through the slot 18 in the wiper 8.

For some users and under some conditions, it may be more desirable to change the slot from a vertical to a horizontal position and for that accomplishment, I bend a short leg 19 down at the unsupported end of the bar 12 and provide it with a bolt hole to receive the stem 11 for attachment of the wiper in a position at right angles to that shown in the drawing.

While I have herein shown and described my invention in the one particular form, it is obvious that structural variations may be made without departing from the spirit of the invention and I, therefore, do not desire to be limited to that precise form beyond the limitations as may be imposed by the following claims.

I claim:

1. In an oil stick wiper having a bracket support comprising a horizontal member and means for attachment of the horizontal member to a motor car, a wiper of sponge rubber formed with a pair of spaced apart parallel holes and slotted between the holes, in combination with a U-shaped connector, the parallel legs of which are inserted in and freely removable from corresponding holes in the wiper, and means for attaching the connector to the horizontal member.

2. In an oil stick wiper having a bracket support comprising a horizontal member having a bolt hole one end of said horizontal member being bent down and formed with a bolt hole, a wiper of sponge rubber formed with a pair of spaced apart parallel holes and slotted between the holes, in combination with a U-shaped connector, the parallel legs of which are inserted in corresponding holes in the wiper and the U-shaped connector having a screw-threaded extension on the opposite side from the parallel legs inserted selectively in one of the bolt holes in the bracket support, and a nut screwed on the extension bolting it to the support.

RUSSELL M. HAYS.